United States Patent
Friedman

[15] 3,671,748
[45] June 20, 1972

[54] METHOD AND APPARATUS FOR POSITIONER CALIBRATION SYSTEM

[72] Inventor: David Friedman, Framingham, Mass.

[73] Assignee: Computervision Corporation, Burlington, Mass.

[22] Filed: Aug. 24, 1970

[21] Appl. No.: 66,211

Related U.S. Application Data

[63] Continuation-in-part of Ser. No. 850,976, Aug. 18, 1969, Pat. No. 3,617,757.

[52] U.S. Cl..............................250/201, 250/202, 250/203, 356/172
[51] Int. Cl.....................G01j 1/20, G05b 1/00, G01b 11/26
[58] Field of Search..........................250/201, 202, 203, 204; 356/172

[56] References Cited
UNITED STATES PATENTS

2,969,707  1/1961  Hansen...................................356/172

Primary Examiner—James W. Lawrence
Assistant Examiner—T. N. Grigsby
Attorney—Chittick, Pfund, Birch, Samuels & Gauthier

[57] ABSTRACT

A method and apparatus for automatically calibrating the position of a movable article between two reference positions in terms of the output of an electrical position sensor. The method and apparatus are used in an article positioning system in which it is desired to precisely position the article at a preselected proportion of the distance between the reference positions. Variations in the sensing paths are compensated for by automatically registering the sensor outputs when the article is at each reference position and then interpolating other sensor values between these to obtain the article's position.

18 Claims, 15 Drawing Figures

PATENTED JUN 20 1972 3,671,748

INVENTOR.
BY DAVID FRIEDMAN

Chittick, Pfund, Birch, Samuels, & Gauthier

METHOD AND APPARATUS FOR POSITIONER CALIBRATION SYSTEM

CROSS REFERENCE TO RELATED APPLICATION

This application is a continuation-in-part of the co-pending application, Ser. No. 850,976, filed Aug. 18, 1969 by James M. Mulvaney, et al. now U.S. Pat. No. 3,617,751 and assigned to the same assignee as the present application.

BACKGROUND OF THE INVENTION

Recently, automatic positioning systems have been employed in the manufacture of integrated circuits to align an integrated circuit wafer with an optical mask. The positioning system uses sensors to generate oppositely varying signals which track the relative position of the mask and wafer. A servo-loop automatically positions the wafer for balanced sensor signals. Multiple sensors, logic interpreters, and corresponding servos provide the desired wafer positioning along several axes, such as, linear X and Y axes and a rotational axis. Unfortunately, variations in the sensitivities of the sensors are likely and these variations can cause a concomitant position error. For a typical optical sensor, the variations include changes in the light source output, the light path transmission and the photodetector and amplifier gains and offsets. These variations can easily produce a positioning error in the automatic system which exceeds positioning tolerances required in the manufacture of integrated circuits.

It is therefore a general object of the present invention to provide a calibration method and system for an automatic positioner which compensates for these variations before each positioning operation.

It is a specific object of the invention to provide a calibrating system which operates automatically by itself at the start of each article positioning operation.

It is another object of the invention to provide relatively simple circuit means in the calibrating system to generate a compensating signal of sufficient accuracy to insure proper article positioning by an automatic positioner.

BRIEF SUMMARY OF THE INVENTION

The preferred embodiment of the present invention is an improvement to the electro-optical, light balanced, null seeking, servo controlled, incremental movement positioning system described in the above-mentioned co-pending application. In the original article positioning system, each axis of motion had two sets of photoelectric elements or photodetectors which produced oppositely varying signals. The signals were differenced and logically processed to produce X,Y, and θ electrical signals representing the displacement of the article with respect to the X,Y, and θ axes. Ideally, the differenced photodetector signals producing the X,Y, and θ signals should null to zero when the article was properly positioned.

The X,Y, and θ signals each had a parameter which changed between a first state and a second state depending upon the sign of the signals. Motion means or incremental article positioners, such as step motors, responded to the parameter states of X,Y, and θ signals by producing article movement in one direction if the signal parameter was in the first state and in the opposite direction if the signal parameter was in the second state. Separate counting means were provided for counting the changes in state of X,Y, and θ signals which corresponded to the number of X,Y, and θ signal null transits. After the counters reached a predetermined count, the incremental article positioners were inhibited thereby leaving the article within one X,Y, and θ step of the desired position.

The improvement to the previously mentioned article positioning system provides for calibration of the system so that parameters representing X,Y, and θ displacements change between first and second states at the exact desired position or within one step thereof despite variations in gain, offset, and sensitivity of the system. Instead of balancing or nulling the signals from one set of photodetectors against the signals from the other set, the photodetector signals for each axis are combined and compared with a reference signal and the article positioned for agreement between the reference and combined signals. To do this, the article is driven to positions of maximum and minimum outputs of the sensors or photodetectors. The outputs of the photodetectors reach these maxima and minima in the preferred embodiment when the article has moved to fully augment light transmission along the path of light incident on the photodetectors in the case of maxima and to fully diminish it for minima. The article position at the onset of maxima and minima in the outputs define reference positions. Knowing the maxima and minima in the combined sensor outputs and the transfer functions of the sensors, it is possible to establish the exact signal for the combined outputs of the sensors when the article is at a desired position which represents a preselected percentage of the distance between the reference positions at the onset of maxima and minima along each axis.

In the preferred embodiment, these maxima and minima are stored in sampling circuitry as the article is positioned first at a point of one and then the other of the two extremes in sensor output. Suitable logic circuitry produces a reference signal with a value between the extremes which corresponds to the desired position for the article along each axis. A comparator then generates either the first or second signal parameter state depending on whether the combined sensor's signal is above or below the reference signal.

The objects and features of the present invention will best be understood from a detailed description of a preferred embodiment thereof, selected for purposes of illustration, and shown in the accompanying drawings in which:

DETAILED DESCRIPTION OF A PREFERRED EMBODIMENT

The present invention relates to a calibration system and technique for use with automatic article positioning systems. One such positioning system is described in U.S. patent application, Ser. No. 850,976, filed Aug. 18, 1969, for Method and Apparatus for Article Positioning Utilizing an Incremental Article Drive System and Null Transit Counter and now U.S. Pat. No. 3,617,751. The calibration system of the present invention effects a basic change in the operation of the article positioning system disclosed in U.S. patent application, Ser. No. 850,976, and to understand this change, the following description provides, after a short overview, a discussion of the operation of the article positioning system, a detailed description of the automatic calibration system by itself and, finally, a description of the combined article positioning system and the automatic calibration system.

The automatic positioning system described in the above mentioned application comprises an electro-optical, light balanced, null seeking, servo controlled, incremental movement, article positioner. For purposes of illustration, the following overview description of the article positioning system will be made with respect to an automatic, semiconductor mask-to-wafer aligner.

Figure 1A:
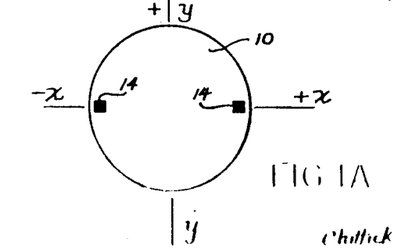
FIG. 1A is a plan view of a semi-conductor wafer having two alignment targets marked thereon.
Figure 1B:
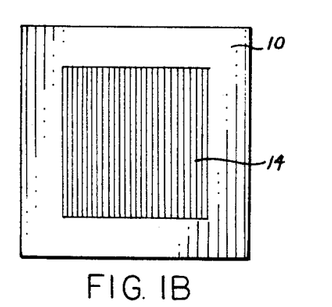
FIG. 1B is an enlarged view of a portion of the semi-conductor wafer which includes one of the wafer targets shown in FIG. 1A.
Figure 2:
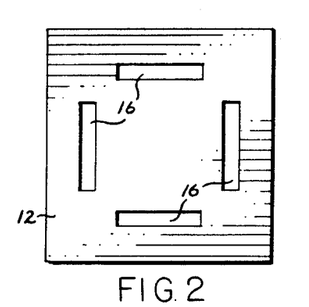
FIG. 2 is a plan view of an alignment mask which mates with the wafer target shown in FIG. 1B.
Figure 3:
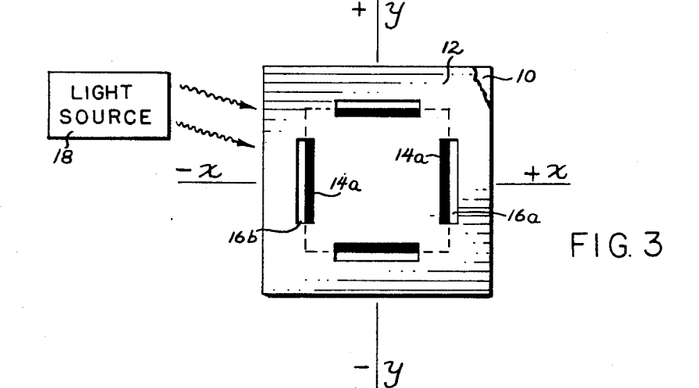
FIG. 3 is a plan view showing the mask of FIG. 2 superposed on the wafer target of FIG. 1B.

Turning now to the drawings, and particularly to FIGS. 1 through 4 thereof, there are shown in simplified form the basic elements of a mask-to-wafer alignment system. The object of the automatic mask-to-wafer aligner is to align a semiconductor wafer 10 (positive medium) with an overlying photographic mask 12 (negative medium). In order to accomplish this function, two alignment targets 14 are first marked on the semiconductor wafer 10 near the edges thereof and along one of the wafer coordinate axes, in this case the X-axis. The targets 14 each have a different light reflection characteristic from the background area of the wafer. A well defined border or edge is provided on the target to produce a sharp transition from the light reflecting characteristic of the target to the different light reflection characteristic of the wafer background area. The mask has a plurality of windows, slits or apertures 16 that are arranged on the mask so that when the mask is superposed on one of the wafer alignment targets 14, as shown in FIG. 3, the mask will mate with the target and, if the mask and wafer are correctly aligned, equal areas 14a of the target will be visible through the mask windows 16. After the wafer has been brought into close proximity and parallel to the mask, the pair are illuminated by light from suitable light source 18. The reflected light energy that is transmitted through the mask window 16a is collected and impinges upon a first photodetector 20 and, likewise the reflected light energy that comes through mask windows 16b impinges upon a second photodetector 22. The output signals from photodetectors 20 and 22 are amplified by amplifiers 24 and 26, respectively, and applied as inputs to a comparator 28.

If the target area 14 is assumed to be dark with respect to the background area of the wafer 10 so that more light will be reflected from the wafer background than from the target, it can be seen that the output of the photodetectors will be equal and greater than zero only when the mask is aligned to wafer with equal areas of the target visible through mask windows 16a and 16b. If, on the other hand, the mask is misaligned, the photodetector viewing the window which has a greater area of the wafer background visible will produce a larger output signal indicating that the wafer must be moved in the direction of the window transmitting the most light. For example, looking at FIG. 3 which illustrates the aligned mask-to-wafer position, if it is assumed that the mask is shifted along the X axis in the −X direction, photodetector 20 will receive more light through mask window 16a than photodetector 22 receives through the mask window 16b. In this situation, the comparator 28 produces a positive output signal which actuates wafer position X-step motor 30 and its associated mechanical linkage 31. The step-motor-linkage combination incrementally advances the wafer, step-by-step in a positive direction along the X-axis upon interrogation by a clock pulse. Conversely, a negative output from the comparator 28 causes the wafer position X-step motor and linkage to incrementally advance the wafer in a negative direction along the X axis. When a light balanced condition is reached so that the outputs from the photodetectors 20 and 22 are equal, the step motor stops if the comparator 28 has a built-in "dead-band." Without the dead-band, the positioning system will still operate though far from desirably because of oscillatory motion of the wafer.

Figure 4:
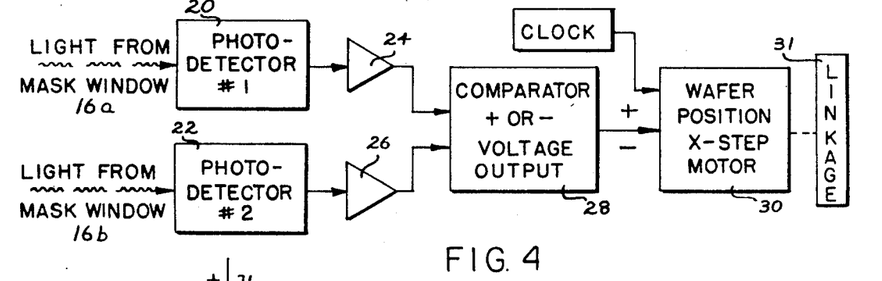
FIG. 4 is a simplified block diagram of the circuitry employed to provide differential, incremental movement between the mask and the wafer.

It is evident that the positioning system can operate with continuous analog motion instead of incremental motion if an analog or d.c. servo motor is used in place of the X-step motor 30. Also, the comparator 28 may then be an analog differential amplifier. A dead-band is also desirable here to produce stability at the null position.

Having briefly reviewed the automatic positioning system for aligning an integrated circuit wafer with a mask, I will now describe the automatic calibration system of the present invention and its relationship to the positioner. The inclusion of the automatic calibration system in the positioning system substantially changes the manner in which the positioner senses its desired mask to wafer alignment. The positioner, as described above, positions the wafer for a balance in oppositely varying photodetector outputs representing light reflected off the wafer and targets through each of two sets of mask apertures per axis. When the automatic calibration system is added to such a positioner, light balancing is no longer necessary. Instead, the outputs of the photodetectors are calibrated in terms of the position of the target edge directly below each edge by registering the outputs at those positions. The automatic calibration system then positions the wafer for photodetector outputs representing a preselected percentage of the distance between the reference positions.

Since the automatic calibration system of the present invention allows the positioner to operate from as few as one photodetector per axis viewing light from one aperture or window 16, the calibration system will be described first as a single axis, single aperture calibration system. In this way the edge scanning feature of the calibration system will become clear as distinct from the light balanced, null-seeking feature of the positioner alone.

Figure 5:
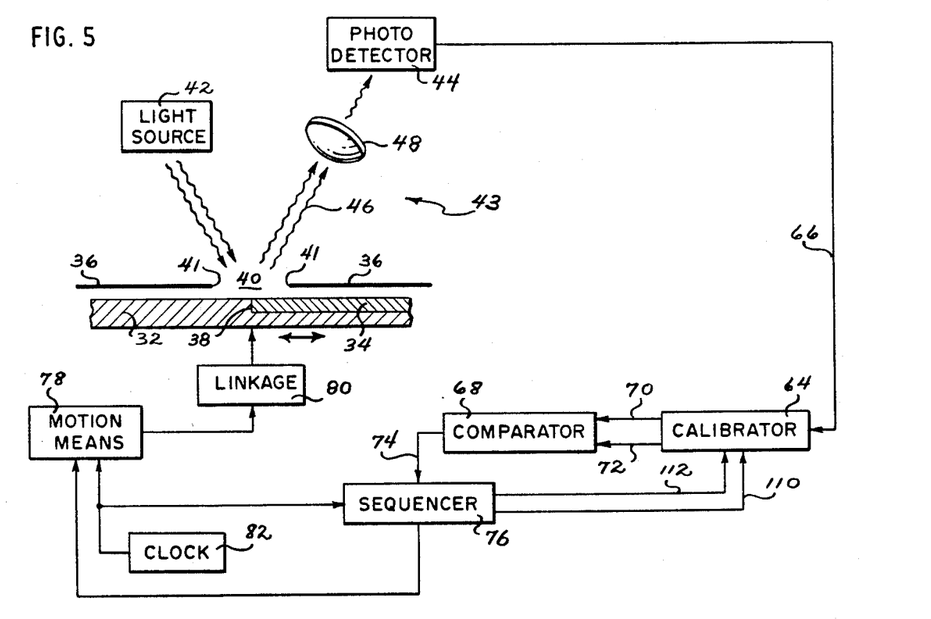
FIG. 5 is a simplified block diagram and sectional view of the mask and wafer used in the automatic calibration system.

The details of the apparatus and its operation in the preferred embodiment can be understood by referring to FIG. 5 where a wafer 32 and target 34 are sectionally shown below an aperture 36. The target and wafer are movable along the left-right axis of the drawing as shown by the double ended arrows. The target edge 38 between the wafer 32 and the target 34 normally lies below an aperture or window 40 between edges 41 in the mask 36. Light from a light source 42 illuminates both the wafer 32 and target 34 through the window 40. Light reflected from the wafer and target returns through the window to a photodetector 44 via light path 46 and optics 48. The light source, window, target, wafer, and photodetector in combination form an electrical output position sensor indicated generally by the reference numeral 43.

Figure 6:
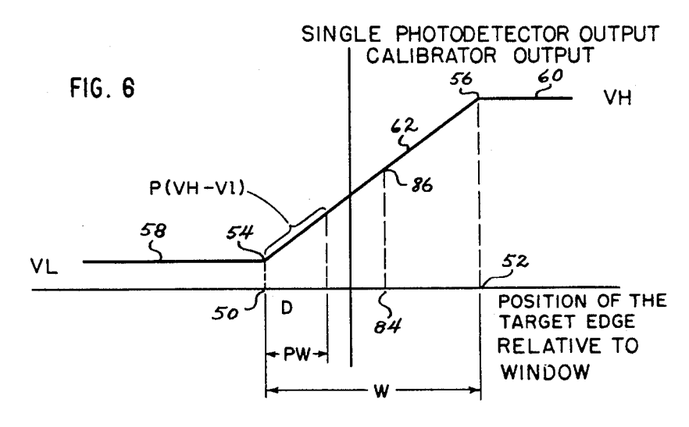
FIG. 6 is a diagram representing the output of a photodetector which senses the relative positions of the target and mask.

The operation of the automatic calibration system depends upon the fact that the target 34 has a different light reflectivity from the wafer 32. Thus, a light of varying intensity will be incident on the photodetector 44 as the target edge 38 moves left and right below the window 40 as long as the target edge 38 remains within view through the window 40. A representative output of the photodetector 44 versus target position is shown in FIG. 6. When the target edge 38 is at position 50 in FIG. 6 the edge 38 is fully extended across the window 40 to one of the edges 41 exposing only target 34 or wafer 32 depending upon the relative reflectivity of the target and wafer. At position 52, the target edge 38 is drawn to the opposite window edge 41.

At these points of the target edge position, the photodetector's output is at knees 54 and 56 respectively. From the physical location points 50 and 52, the photodetector output does not change with movement of the target edge 38 farther away from the window 40 because the reflectivity of the target and wafer are constant and the photodetector 44 sees only light reflected entirely by the target or wafer at those extremes and beyond. With only the target or wafer visible through the window 40, the outputs of the photodetector 44 is a constant which defines plateaus 58 and 60 of minimum and maximum output. The knees 54 and 56 in the photodetector's output define the points where the maximum and minimum outputs are first sensed and they further indicate that the target 34 is positioned with the target edge 38 directly below a window edge 41. The knees 54 and 56 thus define known positions of the wafer relative to the mask. Between the knees is the range of variation 62 of the photodetector's output. Knowing the output value of the knees 54 and 56 and the way in which the photodetector's output varies between them, the position of the target edge 38 relative to the window edges 41 can be exactly related to the output of the photodetector 44. The edges 41 of the window thus operate as reference points in a frame for positioning the wafer 32 and target 34.

Normally, the range of variation 62 will be linear. For such a case, we can define the value of the knees 54 and 56 as VL and VH respectively and the distance between the window edges 41 as W. W is also the distance between points 50 and 52 in FIG. 6 along the target position axis. Assuming now that it is desired to position the target edge 38 at location D which is a preselected percentage, P, of the distance W from point 50 to point 52, then the output of the photodetector 44 will be the same percentage P of the way between plateau 58 and plateau 60 when the target edge is positioned at D. The distance between points 50 and D is PW. The corresponding difference in output values of photodetector 44 between the value VL at knee 54 and the value at D is P (VH−VL). The output of the photodetector 44 at D is thus P(VL−VH)+VL.

To position the wafer 32 with the automatic calibration system, the values VL and VH at knees 54 and 56 must be determined. To measure these knee values it is only necessary to determine the photodetector 44 output at any position in the adjacent plateau. A four-part positioning sequence is used to measure these plateaus and position the wafer for a photodetector 44 output which is the preselected percentage of the way between the plateaus. The circuitry shown in block form in FIG. 5 is designed to execute this sequence.

Referring back to FIG. 5, the output of the photodetector 44 is applied to a calibrator 64 via line 66. Calibrator 64 is capable of combining differentially or cumulatively the outputs of a plurality of photodetectors and passing the combination to a comparator 68 by means of line 70. When only one photodetector is used as shown in FIG. 5, the "combination" on line 70 is the same as the photodetector 44 output on line 66 and FIG. 6 represents the output of calibrator 64 as well as photodetector 44. A reference signal from calibrator 64 is fed to the comparator 68 on line 72. The output of comparator 68 on line 74 is a state signal drive excitation which is in one two states, a (+) or a (−) state, ate, depending upon the sign of the difference between the signals on line 70 and 72. Noise prevents the zero difference condition from existing. The state signal drive excitation on line 74 is fed to a sequencer 76. In its normal condition, the sequencer 76 passes the drive excitation to a motion means 78 which produces left-right motion of the wafer 32 through a linkage means 80 depending on the state of the drive excitation. Motion means 78 is clocked by a clock 82 which provides a periodic pulse to the motion means 78 so that it generates a left or right motional step in the wafer 32 coincident with the clocking pulse. The step direction depends upon the state of the drive excitation. If neither state is present as drive excitation to the motion means 78, no motion is generated at the clock pulse.

For a negative feedback positioning loop, the wafer 32 will oscillate about the position where the photodetector's 44 output carried on line 70 is equal to the signal on line 72. The oscillation of the wafer about this position can be terminated by a dead-band or preferably by the circuit means described below. However, for the moment, any effect from this oscillation can be disregarded.

At the start of each positioning sequence the reference signal on line 72 is set at a value estimated to be the preselected percentage of the way between the plateaus 58 and 60. As the first part of the sequence, the wafer is driven by the drive excitation motion means until it oscillates about the position where the photodetector's output signal on line 70 is equal to the reference signal on line 72.

When the wafer 32 has reached the point of oscillation the target edge 38 is positioned between the window edges 41 for example, as shown at position 84 in FIG. 6. This position corresponds to the estimated value at point 86 in the range of variation 62 of the output of the calibrator 64 or photodetector 44. Variations in reflectivity of the target and wafer in transmission of the light path 46 and in sensitivities and offsets in the photodetector 44 and the calibrator 64 introduce an uncertainty into the correspondence between the signal on line 70 and the position of the target edge 38. This uncertainty prevents exact positioning of the target edge 38 a preselected percent of the distance between window edges 41.

In part two of the positioning sequence, the sequencer 76 interrupts the state signal drive excitation from the comparator 68 to the motion means 78, and replaces it with a continuous state signal drive excitation of either the (+) or (−) state. This continuous state signal is maintained for a number, S, of clock pulse equal to the number, S, of steps of motion necessary to drive the wafer 32 a distance at least equal to the entire width, W, of the window 40 between edges 41. When this number, S, of steps has been executed, the target edge 38 will have been driven at least as far as one of the edges 41 of the window 40 thereby insuring that the output of the photodetector 44 and calibrator 64 will be in one of the plateaus. At the same time, the calibrator 64 measures and stores the signal value on line 70 which is the value of the plateau.

After the first continuous drive and signal storage for at least the distance W, the direction of drive is reversed in part Three of the sequence and the wafer 32 is driven at least a distance 2W in the opposite direction executing twice the number, 2S, of steps as in part Two. The part Three continuous drive in the opposite direction is provided by sequencer 76 supplying a continuous state signal drive excitation of the opposite state from that in part Two to the motion means 78 until the number, 2S, of steps has been executed. After 2S steps the target edge 38 will have been driven back across the window 40 at least to the opposite edge 41 insuring that the output of photodetector 44 and calibrator 64 will be in the opposite plateaus. At this time the plateau value of the signal on line 70 is again measured and stored by the calibrator 64.

After part Three, both plateau values are stored in the calibrator 64. Adjustable means, such as a potentiometer, within the calibrator 64 produces a signal with a value which is the preselected percentage of the way between the plateau values. In part Four of the sequence, the estimated reference signal on line 72 is replaced by the signal produced by the adjustable means. Sequencer 76 then reconnects the state signal drive excitation from comparator 68 to motion means 78. When the wafer 32 again reaches the point of oscillation, the target edge 38 will now be oscillating about a location which is at preselected percentage of the distance between window 41. This location, of course, corresponds to the point along the range of variation 62 which is the same preselected percentage of the way between the plateaus 58 and 60.

Figure 7:
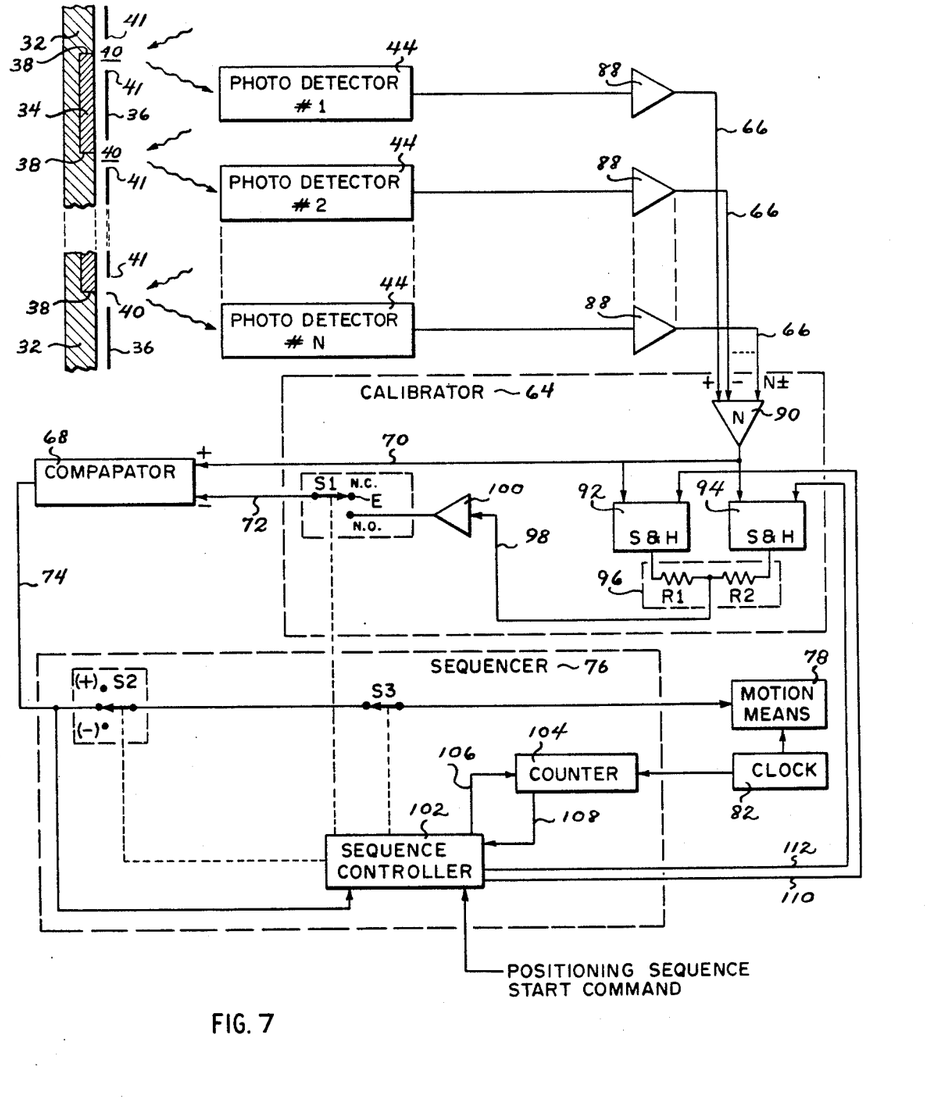
FIG. 7 is a block diagram and partial schematic showing the circuit details of the FIG. 5 block diagram.

Having described the general operation of the preferred embodiment of the automatic calibration system, I will now describe the preferred circuitry within the calibrator 64 and sequencer 76 in connection with a general system having more than one photodetector 44 and window 40 per axis. Referring to FIG. 7, N photodetectors 44 each generate an electrical output representative of the incident light intensity as received from the corresponding N apertures 40 for one axis. Each photodetector 44 has an output which varies with wafer motion and the slope of the output is either positive or negative depending upon the relative position of the target 34 with respect to the target edge 38. In FIG. 4, photodetector #1 views a target which extends downwardly from target edge 38 while photodetector #2 views a target which extends upwardly from the target edge. Thus the outputs from photodetectors #1 and #2 will vary oppositely, one increasing while the other decreases.

Amplifiers 88 amplify the outputs from the photodetectors and the amplified photodetector signals are then applied to calibrator 64 whereon an amplifier 90 receives them differentially or cumulatively from lines 66. In general, outputs of similarly varying photodetectors will be combined cumulatively and outputs of oppositely varying photodetectors will be combined differentially by amplifier 90. The output of amplifier 90 is fed to comparator 68 on line 70.

Line 70 also carries the amplifier output signal to sample and hold circuits (S&H) 92 and 94 within calibrator 64. Each sample and hold circuit is capable of storing a single value of the signal on line 70. Together they store the two previously mentioned plateau values VL and VH. The stored values are buffer amplified and outputted separately by each sample and hold circuit to a voltage divider 96. The voltage divider receives as inputs the value stored in each S&H circuit and connects them through two resistances R1 and R2. The connection between the two resistances is taken as the output of the voltage divider 96 on line 98.

The line 98 output is a signal with a value intermediate to the plateau values. The values of R1 and R2 establish the preselected percentage of the way between the two plateaus. The line 98 output is buffer amplified in amplifier 100 and in turn connected to the normally open terminal of switch S1. The normally closed contact of switch S1 is at an estimated value, E, for the preselected percentage of the way between the two plateaus. In the normally closed position of switch S1 this value, E, is connected as the reference input signal to comparator 68 on line 72. When switched, S1 applies the intermediate signal value from voltage divider 96 to one input of comparator 68.

The output from comparator 68 is a state signal drive excitation which is in one of two states, a (+) or (−) state, depending upon the sign of the difference between the signals on input lines 70 and 72. The comparator output signal is applied to the sequencer 76 via line 74. Two switches are provided in the sequencer and in their normal positions, the switches pass the output of comparator 68 through the sequencer 76 to motion means 78.

Sequencer switch S2 is actuated by a sequence controller 102 to interrupt the signal flow from comparator 68 to motion means 78 and to substitute therefor a continuous state signal drive excitation for motion means 78. Switch S3 is activated by sequence controller 102 to interrupt all drive excitations to motion means 78 momentarily at the end of parts Two and Three of the positioning sequences to allow sampling.

The proper duration for the continuous state signal drive excitations in parts Two and Three of the positioning sequence is secured by a counter 104 which receives clocking pulses from the clock and uses them to count to one of two different total sequential pulse accumulations, S or 2S. The number of pulse accumulations equals the number of steps necessary to drive the wafer at least the distance W or 2W respectively. The proper pulse accumulation is selected and the count initiated by sequence controller 102 over line 106. Each selectable count corresponds to a continuous state signal drive excitation which switch S2 initiates and passes to motion means 78. The count begins when the corresponding continuous state signal is initiated and proceeds during the time that the continuous state signal is connected to motion means 78.

The count for part Two of the calibration sequence is S and for part Three is 2S. When the selected total count or pulse accumulation for parts Two or Three has been accumulated in counter 104, the counter signals this occurrence via line 108 to the sequence controller 102 which in turn opens switch S3 thereby terminating wafer motion. A store command is then sent on line 110 or 112 to the sample and hold circuit corresponding to each count. Sample and hold circuit 92 is used to store the line 70 signal at the end of one count while sample and hold circuit 94 is used to store the line 70 signal at the end of the other count. The stored signals, equalling the combined plateaus, appear at the output of each S & H circuit for voltage division to a value which is a preselected percentage of the way between the plateau values.

Figure 8:
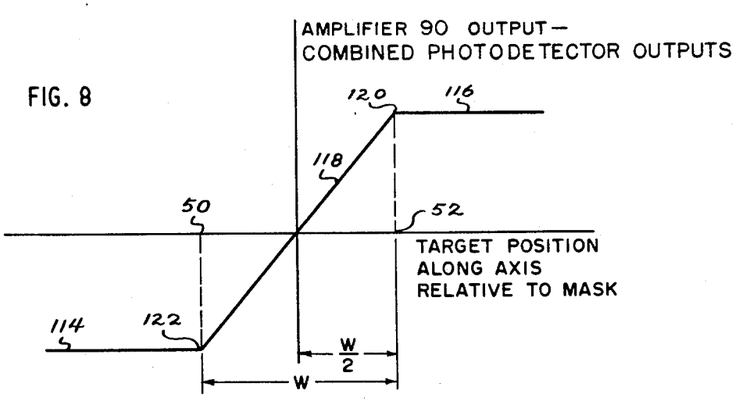
FIG. 8 is a diagram representing the output of an electrical means for combining the outputs of several photodetectors.

Looking now at FIG. 8, there is shown a diagram of the combined and amplified photodetector outputs varying with wafer position. Where N is even and a set of N/2 photodetectors vary linearly together and other N/2 photodetectors form a second set varying oppositely to the first set, all outputs in each set are first added and then the two sets are differentially combined.

Of special interest is the case where N=2 and each photodetector output varies oppositely to the other output such is the case with photodetectors #1 and #2 shown in FIG. 7. The differentially combined photodetector outputs versus wafer position is shown in the curve of FIG. 8.

Also of interest is another special case where the preselected percentage is 50 percent indicating a desired position for the target edge 38 halfway between the window edges 41. The difference in photodetector outputs on line 70, as shown in FIG. 8, is zero at approximately the position where the edges 38 of the target 34 are halfway between the edges 41 of window 40. Given this situation, estimated reference signal, E, on line 72 with switch S1 in the normally closed position is at zero potential for the initial positioning of the target.

Plateaus 114 and 116 in the FIG. 8 curve represent the differences between the plateaus for the two photodetectors. If $V_1$ is the FIG. 8 plateau stored in S&H 92 and connected to R1 (FIG. 7) and $V_2$ is the opposite FIG. 8 plateau stored in S&H 94 and connected to R2, then the value $V_o$ at the output of the voltage divider 96 is:

$$V_o = (R_2 V_1 + R_1 V_2)/(R_1 + R_2) \qquad (1)$$

The position of $V_o$ relative to $V1$ and $V2$ can be adjusted with R1 and R2. Where it is desired to position the target 34 with its edges halfway between the aperture edges R1 is made equal to R2. In that case:

$$V_o = V_1 + V_2/2 \qquad (2)$$

which is the average value of the combined FIG. 8 plateaus or a value 50 percent of the way between them. Amplifier 100 then buffer amplifies the output of the voltage divider 96 and presents this value to the normally open contact of switch S1.

In the Fourth part of the positioning sequence under these conditions, switches S2 and S3 are put in a condition to conduct the stage signal drive excitation from comparator 68 to motion means 78 and switch S1 is made to conduct the intermediate value output from the voltage divider 96 to the input of comparator 68. When the target is finally positioned it will be within one step of the condition:

$$V_1 + V_2/2 = V_{line\ 70}$$

This insures that the target is positioned for photodetector outputs midway between their plateaus and consequently the target has its edges 38 midway between the window edges 41.

If the plateaus 114 and 116 are not perfectly flat but have a slope C, the target edge 38 can be positioned accurately between the edges 41 of the windows 40 by successive repetitions of parts Two, Three, and Four of the positioning sequence. If the slope in the combined range of variation 118 is K; the desired position along the target position axis is halfway between the plateaus; and $I_n$ is the output value of the voltage divider 96 in terms of target positions after the Nth repetition ($I_o$=0)then:

$$I_n = \frac{1}{2K}\left[(a+b) + 2CI_{n-1} - \frac{C}{K}(a+b)\right] \qquad (3)$$

where $a$ and $b$ are the knee value 120 and 122 respectively, and the linear range 118 is defined to pass through the point of simultaneous zero in the output of amplifier 90 and target position which can be done without loss of generality.

Converting to a more convenient form:

$$I_n = \frac{a+b}{2K} + \frac{C}{K} \cdot I_{n-1} - \frac{C}{2K^2}(a+b) \qquad (4)$$

Here $a + a/2K$ is the desired value for $I_n$ and the rest of the equation is the error. If the ratio of the errors for the nth and $n-1$th repetitions is less than one, each repetition will come closer to the point $a+b/2K$.

This ratio is $$R_e = \frac{I_n - \frac{a+b}{2K}}{I_{n-1} - \frac{a+b}{2K}} \quad (5)$$

substituting for $I_n$ $$R_e = \frac{C}{K} \cdot \frac{I_{n-1} - \frac{(a+b)}{2K}}{I_{n-1} - \frac{a+b}{2K}} = \frac{C}{K} \quad (6)$$

Thus as long as the slope $C$ of the plateaus 114 and 116 is less than the slope $K$ of the range of variation 118, the repetition of part Two, Three and Four of the positioning sequence will bring the wafer ever closer to the preselected position, reducing the error by the factor $C/k$ each time.

Figure 9C:
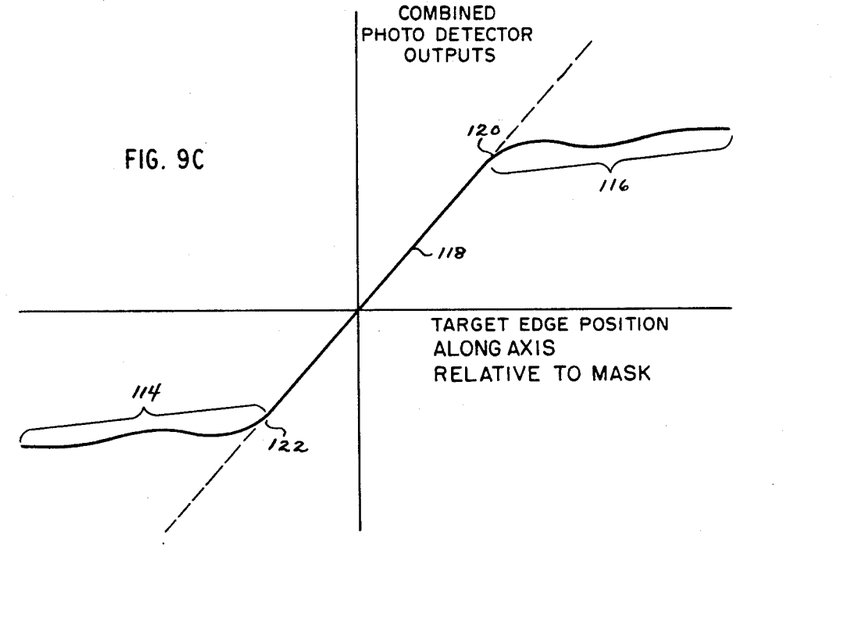
FIG. 9 is a diagram representing the output of an electrical means for combining the outputs of several photodetectors which have non-constant plateaus.

The same analysis holds true for curved smooth plateaus if they are symmetrical about the origin and stay between lines formed by straight extensions of the range of variation 118 and the position axis as shown in FIG. 9.

Figure 10:
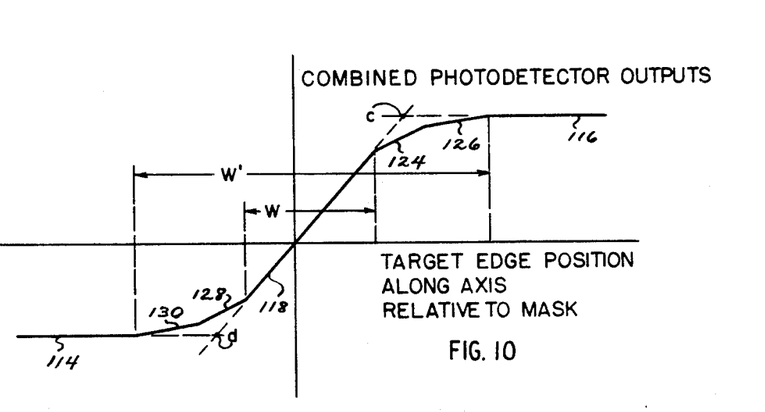
FIG. 10 is a diagram representing the output of an electrical means for combining the outputs of several photodetectors without simultaneous target and aperture alignment.

In the case where more than one sensor is used it is possible that all target edges 38 will not simultaneously align themselves exactly with their corresponding window edge 41. Consequently, there will be an incremental linear transition as shown at 124, 126, 128 and 130 in FIG. 10 between the range of variation 118 where all target edges 38 are within a window 40 and the two plateaus 114 and 116 where all target edges 38 are out of view through each window 40. The distance W covered by the range of variation 118 is less than the distance W1 between the two plateaus 114 and 116. However, the calibration system of the present invention will operate correctly if a distance W' of continuous drive is used where W' is at least equal to the distance between plateaus 114 and 116 and the desired position stays within the range of variation 118. In this situation, the known positions of the wafer relative to the mask are the points at $c$ and $d$ where the extensions of the plateaus 114 and 116 intersect with extensions of the range of variation 118. Variations in the slope of the range of variation 118 will change points $c$ and $d$ in equal and opposite directions, but will not disturb the accuracy of positioning the wafer for combined photodetector outputs halfway between them.

In the preceding description of the preferred embodiment of the calibration system, I referred to the fact that the system is used to calibrate an electro-optical sensor, mask-to-wafer alignment system. However, it should be understood that the calibration system and techniques of the present invention can be employed to calibrate any type of sensor which produces plateaus in its output under certain sensing conditions. It should also be understood that the system and techniques are applicable to sensing systems which sense positional movements either along a linear axis or about a rotational axis. In this regard, the term "axis" is used to mean the degree of freedom in a reference plane.

Having described in detail the calibration system, I will now describe its use in an automatic article positioning system.

Figure 11:
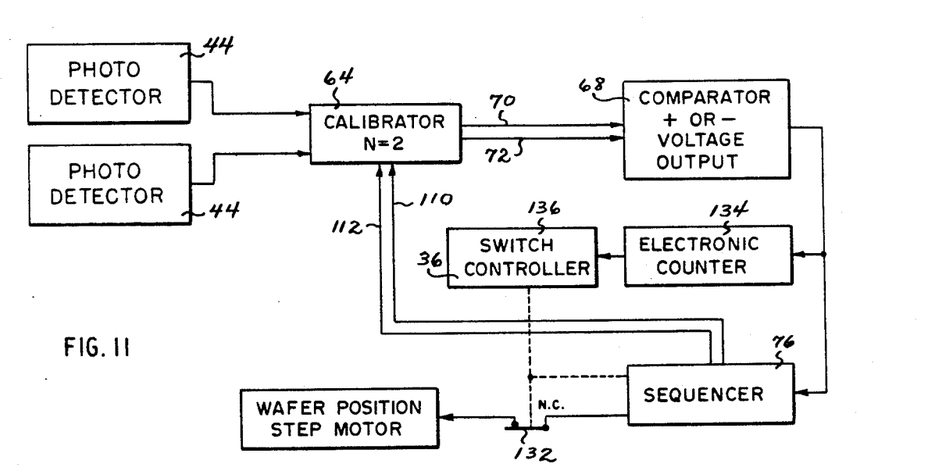
FIG. 11 is a block diagram showing the calibration system in use with the article positioning system depicted in block diagram form in FIG. 5.

Looking back at FIG. 4, the control system shown therein is very difficult to stabilize without a "dead-band" because the output of the comparator 28 as described is either positive or negative and never zero. The positive or negative output voltage from comparator 28 causes the step motor to continuously move the wafer one step first in one direction and then the other when the calibrator's outputs are equal. To prevent this continuous oscillation of the wafer, a dead-band is normally built into the system. To obtain a position error as small as possible, the dead-band should be as small as possible. In fact, the ideal situation would be a dead-band equal to zero. FIG. 11 illustrates an incremental drive-null transit counter system for achieving such a dead-band within a positioning system having an automatic calibration system added to it.

The basic positioning and calibrating system is similar to the one described above. The outputs of two photodetectors 44 are fed to the calibrator 64. The line 70 differential and line 72 intermediate value calibration reference outputs of the calibrator 64 are fed to comparator 68. The output from comparator 68 is fed through the sequencer 76 to step motor 30 which positions the wafer 32 and target 34 at an initial estimate of the desired position to obtain one set of plateaus and then the other set. The calibrator 64 stores the combined plateaus in the manner described above. In part Four of the positioning sequence the target and wafer are driven to the desired position on the basis of the line 72 value. The sequencer 76 in FIG. 11 also recloses a switch 132 between the sequencer 76 and step motor 30 at the start of each Part of the positioning sequence to insure that drive is obtained by the wafer position step motors 30 during that Part. The step motors 30 operate in the same manner as motion means 78 described in connection with the calibration system of FIG. 5.

Dead-banding is achieved by counter 134 counting the number of null transits or state signal reversals from comparator 68 and cooperating with switch controller 136 to open switch 132 after a preset number of reversals to stop oscillations in the step motor 30 and wafer.

Figure 12:
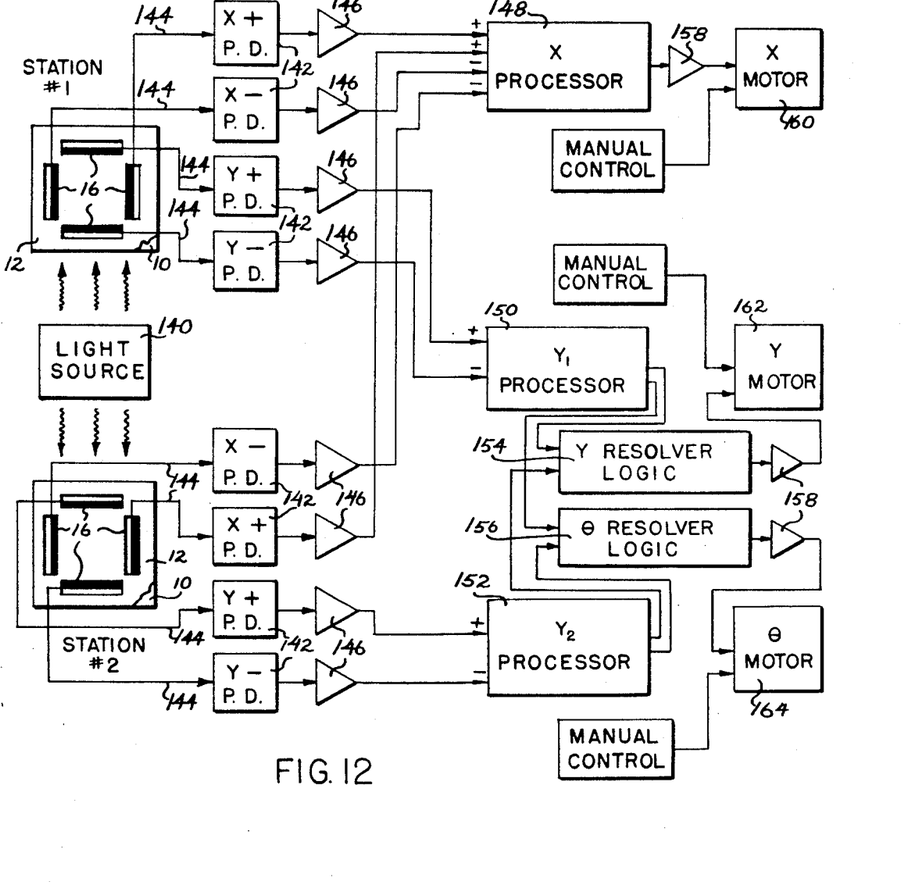
FIG. 12 is a block diagram showing the combinational photodetector signal processing used to obtain X,Y, and θ wafer positioning information.

Having described the dead-band feature in an automatic positioning system with the automatic calibration system, I will now discuss in detail the application of all these features including the calibration system of the present invention to an automatic mask-to-wafer aligner. Turning to FIG. 12, there is shown in block diagram form a 3-axis, incremental drive, automatic mask-to-wafer alignment system. I have already mentioned, in connection with FIGS. 1 through 4, that two wafer alignment targets 14 are marked on the semiconductor wafer near the edges of the wafer and along one of the coordinate axes of the wafer, in this case, the X-axis. Each target is roughly square and thus has four edges. In addition, it has also been pointed out that the two wafer targets 14 are aligned with a mask 12 having two sets of mask apertures 16 which mate with the two targets, one aperture being positioned above each target edge. When the mask and wafer are correctly aligned in superposed relation, all target edges are centered halfway between their corresponding aperture edges. Each combination of a wafer target and an apertured mask section defines an alignment station identified in FIG. 12 as "Station # 1 " and "Station #2".

As shown in FIG. 12, each Station mask section 12 has four apertures or windows 16 through which light is reflected from light source 140. The reflected light is optically coupled to four corresponding photodetectors 142 at each Station, as indicated representationally in FIG. 12 by the light path lines 144. The outputs from the X and Y photodetectors 142 are amplified by amplifiers 146.

Figure 13:
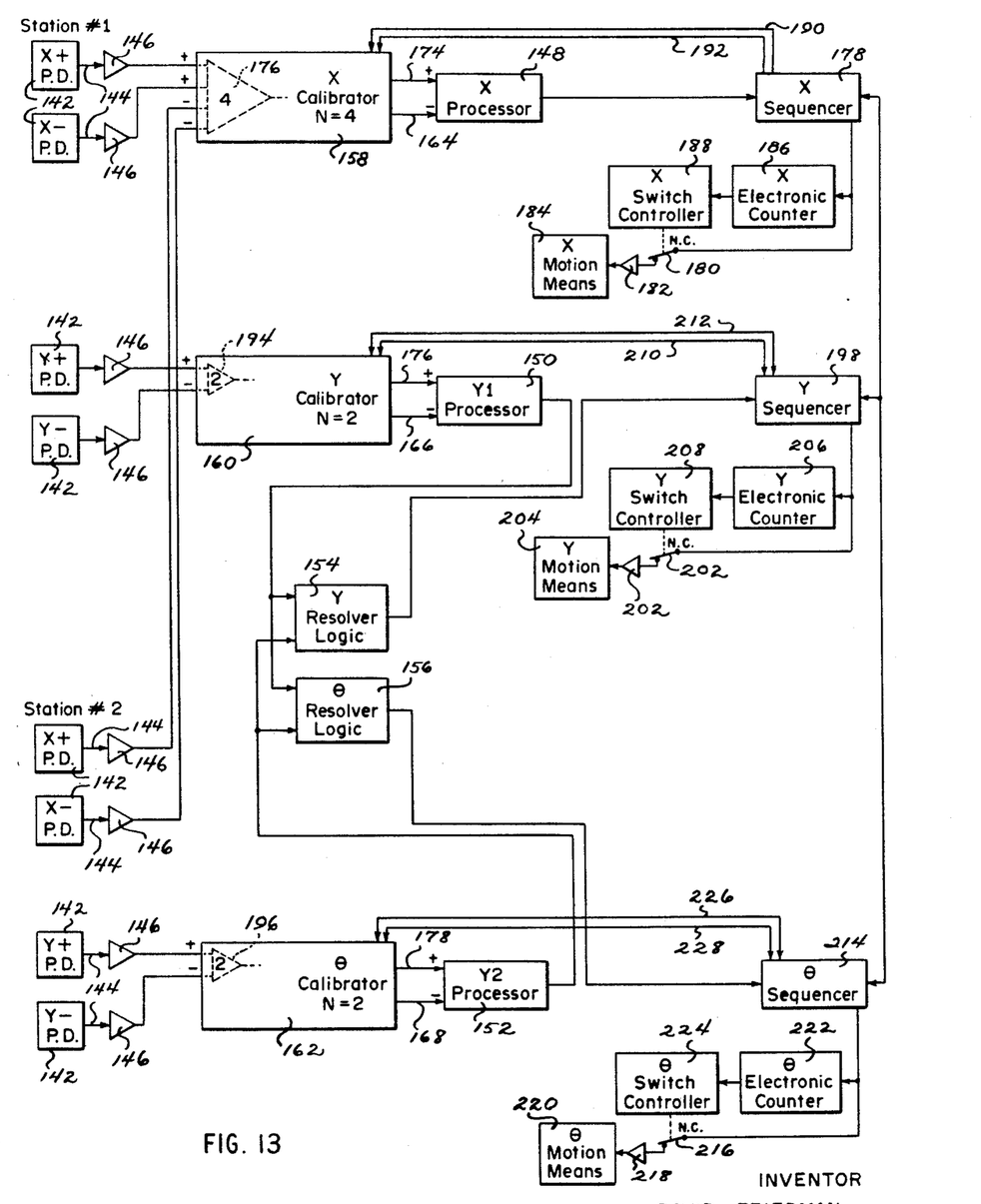
FIG. 13 is a block diagram showing the calibration system in use with the article positioning system illustrated in block diagram form in FIG. 7.
Figure 14:
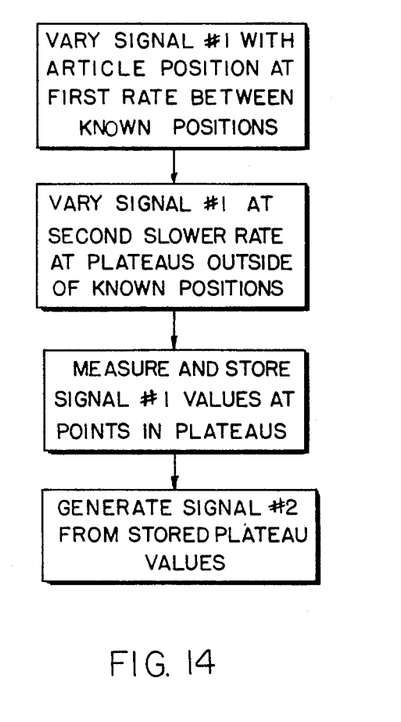
FIG. 14 is a flow diagram of the calibration method.

At this point in the description, it should be noted that in an automatic mask-to-wafer alignment system which incorporates the calibration system and techniques of the present invention, the outputs from amplifiers 146 are applied to the specific calibration circuitry as shown in FIG. 13. However, to provide a basis for the subsequent description of the FIG. 13 circuitry, it will be helpful to first review briefly the combinational photodetector signal processing used to obtain X,Y, and $\theta$ wafer positioning information. It will be appreciated that FIG. 12 corresponds to FIG. 7 in the above-mentioned U.S. patent application Ser. No. 850,976 and reference is made thereto.

The outputs from amplifiers 146 are inputed to the appropriate X,$Y_1$ and $Y_2$ processors 148, 150, and 152 respectively. The output from the X processor 148 is an electrical signal $E_x$ having a parameter which changes between a first state and a second state depending upon the duration of the X-axis displacement of the semiconductor wafer 10 from its aligned position with respect to the mask 12.

The outputs from the $Y_1$ and $Y_2$ processors are combined in Y resolver logic 154 and $\theta$ resolver logic 156 to produce corresponding electrical error signals $E_Y$ and $E\theta$. The $E_Y$ signal has a parameter which changes between a first state and a second state depending upon the direction of the Y-axis displacement of the wafer from the aligned position. Similarly, the $E\theta$ signal has a parameter which changes between a first state and a second state depending upon the direction of the rotational displacement of the wafer from the aligned position.

The X, $Y_1$, $Y_2$ processors and the Y and $\theta$ resolver logic perform the following combinational signal processing:

$E_X = \text{Sgn} (X_{1+} + X_{2+} - X_{1-} - X_{2-})$
$E_Y = \text{Sgn} (Y_{1+} - Y_{1-})$ if $\text{Sgn} (Y_{1+} - Y_{1-}) = \text{Sgn} (Y_{2+} - Y_{2-})$
$E_Y = 0$ if $\text{Sgn} (Y_{1+} - Y_{1-}) \neq \text{Sgn} (Y_{2+} - Y_{2-})$.
$E\theta = \text{Sgn} (Y_{2+} - Y_{2-})$, if $\text{Sgn} (Y_{1+} - Y_{1-}) \neq \text{Sgn} (Y_{2+} - Y_{2-})$
$E\theta = 0$ if $\text{Sgn} (Y_{1+} - Y_{1-}) = \text{Sgn} (Y_{2+} - Y_{2-})$.
where $\text{Sgn} (u) = +1$ if $u > 0$
$(u) = -1$ if $u < 0$ and $\text{Sgn} (u)$ is ignored, and where the first subscript represents the Station Number and the second subscript represents the sign of the photodetector.

The $E_X$, $E_Y$, and $E\theta$ error signals are used after suitable amplification by amplifiers 157, to drive the X, Y, and $\theta$ wafer positioning motors 160, 162, and 164 respectively. From an inspection of the equations for obtaining the $E_Y$ and $E\theta$ error signals, it can been that if the $Y_1$ error is equal to the $Y_2$ error in sign, then the Y motor 162 will be driven while the $\theta$ motor 164 remains stationary. Conversely, if the $Y_1$ and $Y_2$ errors are not equal in sign, then the $\theta$ motor 164 is driven while the Y motor 162 remains stationary. This arrangement is desirable because it overcomes the possibility of erroneous drive commands produced by the difference in saturated Y signals.

Turning now to FIG. 13 which incorporates the calibration system of the present invention, the outputs of amplifiers 146 are inputted to appropriate X, Y, and $\theta$ calibrators, 158, 160, and 162 respectively. Reference outputs on lines 164, 166, and 168 and combined photodetector outputs from X, Y, and $\theta$ calibrators 158, 160, and 162 are fed to the X, $Y_1$ and $Y_2$ processors.

Since X motion is based on signals from four X photodetectors X input amplifier 176 within the X-calibrator 158 has four inputs ($N=4$) with a photodetector output connected to each input. The X calibrator output on line 174 representing combined signals from the four X photodetectors is fed to the X processor 148 on a "plus" input while an intermediate value calibration reference on line 164 is fed to a "minus" input of X processor 148. The output from the X processor is an electrical state signal drive excitation $E_X$ having a parameter which changes between a (+) state and a (−) state depending upon the sign of the difference between the combined X photodetector outputs on line 174 and the line 164 reference. X sequencer 178 controls the passage of the drive excitation to a normally closed X switch 180 and, in turn, to amplifier 182 and X motion means 184. The X motion means moves the wafer along the X-axis to the drive excitation through mechanical linkages (not shown). The output of the X sequencer 178 is fed to an X electronic counter 186 which actuates an X switch controller 188 after a preselected number of state changes in the state signal drive excitation from X processor 148 have been counted by the X counter. The switch controller then opens X switch 180 thereby interrupting the drive excitation path for the X motion means 184. Store commands are produced by the X sequencer 178 at the end of Parts Two and Three of the positioning sequence. These commands are sent to the X calibrator 158 over lines 190 and 192.

At the start of each four part positioning sequence the line 164 reference for X motion is set at the estimated value for the combined X photodetector outputs when all target edges reflecting light to X photodetectors are centered between their respective aperture edges.

Y and $\theta$ motion is based on the outputs of the four Y photodetectors 142 shown in FIG. 13. A separate calibration system is used for the Y and $\theta$ motions. The Y calibrator 160 is placed after the Y outputs of the amplifiers 146 for the Station #1 Y photodetectors 142 and before the $Y_1$ processor 150. The outputs of the Station #1 amplifiers 146 form the inputs to the Y calibrator 160 and the outputs 176 and 166 of the Y calibrator 160 form the inputs for the $Y_1$ processor 150. The input to the $Y_1$ processor 150 on line 176 is the combined outputs of the Station #1 photodetectors are combined in Y amplifier 194 inside the Y calibrator 160. Line 166 carries an intermediate value calibration reference to the Y1 processor 150 from the Y calibrator.

The interconnection of the $\theta$ calibrator 162 is identical to that for the Y calibrator 160. The $\theta$ calibrator receives the outputs of the Station #2 photodetectors 142 through the Station #2 Y amplifiers 146. These outputs are combined in $\theta$ calibrator amplifier 196. The $\theta$ calibrator outputs to the $Y_2$ processor 152 a signal on line 178 which is the combined station #2 Y photodetector outputs and a signal on line 166 which is the reference.

The Y1 and Y2 processors output state signal drive excitations having a (+1) or (−1) state. The output is in one state when the difference between the two inputs to each processor is of one polarity and is in the other state when the inputs are in the reverse polarity. Separate Y and $\theta$ resolver logic circuits 154 and 156 are fed the outputs from the Y1 and Y2 processors respectively. The Y resolver logic 154 inhibits any drive excitation from appearing at its output unless both its inputs are of the same sign or state in which case the Y resolver logic outputs the state signal drive excitation of the Y1 processor output. The $\theta$ resolver logic 156 operates similarly to inhibit any drive excitation from appearing at its output when the signs or states of the inputs to the $\theta$ resolver are the same. When the signs or states are opposite, the $\theta$ resolver outputs the state signal drive excitation of the Y2 processor output.

A Y sequencer 198 is connected on the output of the Y resolver logic 154 and controls the passage of state signal drive excitation from the Y resolver logic to a normally closed Y switch 200 and, in turn, to amplifier 202 and Y motion means 204. Also connected to the output of the Y sequencer 198 is a Y electronic counter 206. The counter and associated Y switch controller 208 operate in the same manner as the corresponding X electronic counter and switch controller 186 and 188 respectively. In a similar fashion, the Y sequencer feeds storage commands to the Y calibrator on lines 210 and 212 during parts Two and Three of a positioning sequence.

A sequencer 214 is connected to the output of the $\theta$ resolver logic 156 and controls the passage of the $\theta$ state signal drive excitation to $\theta$ switch 216, amplifier 218 and $\theta$ motion means 220. The output of the $\theta$ sequencer 214 is fed to ¼ electronic counter 222 which actuates ¼ switch controller 224. Lines 226 and 228 which connect the $\theta$ calibrator 162 and the $\theta$ sequencer 214 are used to feed store commands to the $\theta$ calibrator. $\theta$ motion means 220 cooperates with linkages (not shown) to produce rotation of the wafer about an axis perpendicular to its surface in response to the drive excitation.

At the start of each four part positioning sequence the line 166 and 168 references are set at the value for the combined Y photodetector outputs estimated to be present when all target edges reflecting light to Y photodetectors are centered between their respective apertures or window edges.

The X, Y, and $\theta$ sequencers are tied together by line 230 to provide coordination of the wafer positioning sequence. During part One of the positioning sequence all of the target edges are initially positioned at points estimated to be half-way between the aperture edges. In part Two all sequencers are coordinated through line 230 to allow simultaneous drive of the wafer and target a full aperture width along both X and Y axes at both stations to insure that all photodetectors output a signal in their plateaus. The combined values at the outputs of X, Y, and $\theta$ calibration amplifiers 176, 194, and 196 are stored in the respective Sample and Hold circuits (see FIG. 7) In Part Three of the sequence, the target and wafer are simultaneously driven two aperture widths back in the opposite direction on both X and Y axes to force the photodetector outputs into the opposite plateaus and to allow storage of the combined values resulting from the photodetector outputs. The intermediate value calibration references halfway between combined photodetector plateaus allow exact repositioning of the target and wafer with the edges of the target centered in the apertures during Part Four.

Having described in detail a preferred embodiment of my invention, it will be appreciated that a number of modifications can be made therein without departing from the scope of the invention. For example, while the preceding description has referred primarily to the use of a sensor system in conjunction with reflected light, it should be understood that the calibration system can be used to calibrate a sensor system which receives transmitted light. In fact, in its broadest application, the present invention can be used to calibrate any article positioner which produces a measurable output that positionally relates a movable article and a reference frame, if the output varies as the article moves along an axis in the reference frame between two known positions and if the output varies more slowly with article movement outside the range of positions between the two known points.

What I claim is:

1. Apparatus for calibrating a positioner which positions an article at a selected position between first and second known positions along at least one axis of a reference frame, said calibration apparatus comprising:
   a. means for producing a measurable output which positionally relates the article and the frame, said output varying as said article moves along said axis in one direction between said first and second known positions and which varies more slowly with article movement outside the range of positions between said first and second known positions;
   b. means for measuring and storing the values of the outputs of said measurable output producing means when said article is positioned at points beyond and on opposite sides of said known positions; and
   c. means for establishing an intermediate value between the stored values which, as a percentage between said stored values, is the same as the percentage between said first and second known positions of the location of said selected position along the axis.

2. The apparatus of claim 1 further comprising means for driving said article to points beyond and on opposite sides of the range of positions between said known positions to allow measuring and storing of the output values of said measurable output producing means at said points.

3. The apparatus of claim 1 further comprising drive means for positioning said article at a position where said intermediate value and the output value of said measurable output producing means each have a predetermined value.

4. The apparatus of claim 3 further characterized by said drive means being further adapted to:
   a. first position said article along said axis at an initial position between said known positions; and then
   b. drive said article along said axis to points beyond and on opposite sides said known positions to allow measuring and storing of the output values of said measurable output producing means at said points.

5. The apparatus of claim 4 further characterized by the subsequent drive motions of said article from said initial position being a motion a fixed distance along said axis in a first direction to a first point followed by a motion of twice said fixed distance along said axis in an opposite direction to a second point, said fixed distance being at least equal to the distance between said known positions.

6. Apparatus for calibrating a positioner which positions an article at a selected position between first and second known positions along at least one axis of a reference frame, said calibration apparatus comprising:
   a. sensor means for producing an output representing a sensed quantity which positionally relates the article and the frame, said sensor means receiving the quantity along a path having a transmission of said quantity which progressively changes as said article moves along said axis in one direction between said first and second known positions and which varies more slowly with article movement outside the range of positions between said first and second known positions;
   b. means for measuring and storing the values of the outputs of said sensor means when said article is positioned at points beyond and on opposite sides of said known positions; and,
   c. means for establishing an intermediate value between the stored values which, as a percentage between said stored values, is the same as the percentage between said first and second known positions of the location of said selected position along the axis.

7. The apparatus of claim 6 wherein:
   a. said quantity positionally relating said article and said frame is light; and,
   b. said sensor means includes photodetector means for receiving light reflected off two optically contrasting portions of said article through at least one aperture in said frame,
      the light transmission of said path varying with the amount of each portion of said article which reflects light through said aperture and being non-varying when only one portion is positioned to reflect light through said aperture.

8. The apparatus of claim 7 further characterized by said sensor means further including:
   a. at least two photodetectors each receiving a separate quantity which positionally relates the article and frame along a separate path; and,
   b. means for combining the outputs of said photodetectors, the combined outputs becoming the output of said sensor means.

9. The apparatus of claim 6 characterized by the transmission of said path being constant to produce plateaus in the output of said sensor means outside the range of positions for said article between said known positions.

10. A calibration system for use in a positioner of the type having:
   a. means for moving a first element relative to a second element along an axis in a direction depending upon the sign of the difference between a first and second signal;
   b. sensor means for outputting as said first signal a signal which varies with the position of said first element relative to said second element, said first signal having at least two plateaus of slower variation in said first signal with movement of said first element relative to said second element, said plateaus commencing at first and second known positions along said axis of first element with respect to said second element, said known positions having therebetween a selected position for said first element, said calibration system comprising:
      a. sampling means for recording the values of said first signal at points in its plateaus;
      b. means for generating as said second signal a reference value between the recorded plateau values, which, as a percentage between said recorded plateau values, is the same as the percentage between said first and second known positions of the location of said selected first element position along said axis.
      c. sequencer means for commanding said moving means to position said first element at a point where said first signal is in one plateau and then to position said first element at another point where said first signal is in the other plateau to allow said sampling means to record the values of the output of said sensor means at said plateaus.

11. The calibration system of claim 10 wherein said sequencer means in commanding said motion means to position said first element is further adapted to cause:
   a. first motion of said first element to a position where the output of said sensor means is between said plateaus;
   b. second motion of said first element for a fixed distance at least equal to the distance between said known positions to allow the output of said sensor means to be in one plateau;
   c. third motion of said first element for a distance twice said fixed distance in a direction opposite to said second motion to allow the the output of said sensor means to be in the other plateau; and,
   d. fourth motion of said first element to a point where said first and second signals each have a predetermined value.

12. The calibration system of claim 11 wherein said sequencer is further adapted to cause at least one repetition of said second, third and fourth motions with a new reference value being established during each repetition.

13. The calibration system of claim 11 further characterized by said sensor means sensing a quantity which positionally relates said first and second elements and receiving said quantity along a path having a transmission of said quantity which progressively diminshes as said first element moves in one direction relative to said second element between said known positions and with said plateaus being defined by a reduction in the rate of variation of said path's transmission beyond said known positions.

14. The calibration system of claim 13 characterized by the transmission of said path being constant to produce constant value plateaus in the output of said sensor means outside the range of positions for said first element relative to said second element between said known positions.

15. The calibration system of claim 13 wherein:
   a. said first element is a semiconductor wafer having at least one straight edged target region of different light reflectivity from said wafer;
   b. said second element is a mask having at least one straight sided aperture therethrough;
   c. said sensor means further comprises at least one photodetector receiving light reflected from the regions of different reflectivity of said wafer through said mask aperture; and,
   d. said first and second known positions are the positions where the straight edge of the target region is aligned with the opposite straight sides of said aperture.

16. The calibration system of claim 15 further characterized by:
   a. there being at least two photodetectors in said sensor means receiving light through separate apertures; and,
   b. said sensor means further including means for combining the outputs of said photodetectors, the combined outputs forming the output of said sensor means.

17. A method for automatically calibrating a first electrical signal in terms of a selected position for an article along an axis between known positions of said article along said axis where said selected position is a selected percentage of the distance between said known positions, said method comprising the steps of:
   1. varying said first signal with the relative position of said article along said axis at a first rate when said article is between said known positions;
   2. varying said first signal at a second slower rate when said article is not between said known positions to define two plateaus in said first signal;
   3. measuring and storing the values of said first signal at points in both plateaus in said first signal; and,
   4. generating from said stored plateau values a second electrical signal having a value which as a percentage between said stored plateau values, is the same as the selected percentage of the distance between said known positions of said selected position along the axis.

18. The method of claim 17 further comprising the step of positioning said article along said axis to a point where said first and second electrical signals each have a predetermined value.

* * * * *

UNITED STATES PATENT OFFICE
CERTIFICATE OF CORRECTION

Patent No. 3,671,748   Dated June 20, 1972

Inventor(s) David Friedman

It is certified that error appears in the above-identified patent and that said Letters Patent are hereby corrected as shown below:

Column 5, line 49, delete "ate";

Column 8, line 29, change " $V_o = (R_2V_1 + R_1V_2)/(R_1 + R_2)$ to -- $V_o = \dfrac{R_2V_1 + R_1V_2}{R_1 + R_2}$ Column 9, line 1, change "a+b a/2K to -- a+b/2K line 26, change "C/k" to -- C/K Column 11, line 29, "it can been" should read-- it can be seen--;

Column 12, line 5, " #" should read -- #1--;

line 10, "are combined" should read -- as combined--;

line 52, "1/4" should read -- $\theta$ -- line 53, "1/4" should read -- $\theta$ --

Signed and sealed this 9th day of January 1973.

(SEAL)
Attest:

EDWARD M. FLETCHER, JR.
Attesting Officer

ROBERT GOTTSCHALK
Commissioner of Patents